United States Patent [19]

Michel et al.

[11] Patent Number: 5,231,139

[45] Date of Patent: Jul. 27, 1993

[54] COMPOSITIONS BASED ON VINYLIDENE CHLORIDE COPOLYMERS STABILIZED AGAINST HEAT AND THEIR USE

[75] Inventors: Claude Michel, Wavre; Pascale Nagels, Brussels, both of Belgium; Patrick Francoisse; Bernard Guenaire, both of Tavaux, France

[73] Assignee: Solvay (Société Anonyme), Brussels, Belgium

[21] Appl. No.: 833,851

[22] Filed: Feb. 12, 1992

[30] Foreign Application Priority Data

Feb. 20, 1991 [BE] Belgium .............................. 09100168

[51] Int. Cl.$^5$ .......................... C08L 27/08; C08J 5/18
[52] U.S. Cl. .................................... 525/208; 525/913; 524/114
[58] Field of Search .............................. 525/208, 913

[56] References Cited

U.S. PATENT DOCUMENTS

| | | | |
|---|---|---|---|
| T904,001 | 11/1972 | Haskell ............................. | 525/208 |
| 2,783,250 | 2/1957 | Payne et al. ....................... | 524/114 |
| 2,918,450 | 12/1959 | Hudson ............................. | 524/114 |
| 4,409,350 | 10/1983 | Fujiwara et al. . | |
| 4,546,149 | 10/1985 | Kidoh et al. ...................... | 525/913 |
| 5,030,511 | 7/1991 | Moffitt . | |

FOREIGN PATENT DOCUMENTS 1502453 3/1978 United Kingdom .

OTHER PUBLICATIONS

H. Lee et al.: "Handbook of Epoxy Resins"; McGraw-Hill Book Company, 1967.

Primary Examiner—Carman J. Seccuro, Jr.
Attorney, Agent, or Firm—Spencer, Frank & Schneider

[57] ABSTRACT

A composition containing as an epoxide heat stabilizer at least one glycidyl methacrylate copolymer whose epoxy value is at least 0.4. These effective heat stabilizers do not appreciably affect the transparency and the imperviousness of vinylidene chloride copolymers. The composition in question is particularly suited for the extrusion of sheets and films intended for packaging.

14 Claims, No Drawings

COMPOSITIONS BASED ON VINYLIDENE CHLORIDE COPOLYMERS STABILIZED AGAINST HEAT AND THEIR USE

BACKGROUND OF THE INVENTION

1. Field of the Invention

The present invention relates to compositions based on vinylidene chloride copolymers stabilised against heat and to their use. It relates more particularly to compositions based on vinylidene chloride copolymers stabilised against heat by the use of an epoxide stabiliser and to their use for extrusion of films and sheets intended for packaging.

2. Description of the Related Art

Vinylidene chloride copolymers, usually denoted by the acronym PVDC, form well-known impervious thermoplastic copolymers containing approximately 70 to 96% by weight of monomer units derived from vinylidene chloride, the essential comonomers usually consisting of vinyl chloride and (meth)acrylic esters and/or nitriles. Their high imperviousness, especially to oxygen, makes them materials of choice for the manufacture of films and sheets intended for packaging, in particular in the alimentary field.

It is also well known that PVDCs suffer from inadequate heat stability and that their heat stability is proportionately lower the higher their vinylidene chloride content (and hence their imperviousness). It is therefore indispensable that effective heat stabilisers are added to them before any melt-processing operation such as extrusion.

Many heat stabilisers for PVDCs, generally of the "acid-acceptor" type have already been proposed. These include inorganic compounds such as magnesium oxide and hydrotalcites. These compounds have the disadvantage of resulting in an opacification of articles made of PVDC, so that these inorganic stabilisers have to be ruled out in any application requiring a high transparency.

Epoxy compounds form another known class of effective heat stabilisers for vinylidene chloride copolymers, which do not exhibit the abovementioned disadvantage. The most commonly recommended of these are epoxidised oils, such as epoxidised soya oil and epoxy resins, more particularly liquid epoxy resins consisting essentially of bisphenol A diglycidyl ether. Epoxidised oils, such as epoxidised soya oil, are suitable for stabilising compositions intended for the manufacture of transparent articles However, they have the disadvantage of considerably reducing the imperviousness of the PVDCs in which they are incorporated. Furthermore, the use of liquid epoxy resins of the abovementioned type presents a problem in some countries because of regulations and/or directives imposing very severe limits on the migration and on the residual contents of bisphenol A diglycidyl ether. Recourse to solid epoxy resins derived from bisphenol A, which are less rich in epoxy groups, could possibly attenuate these migration problems, but at the expense of the efficiency where heat stability is concerned or of the imperviousness in the case of increase in the quantities of solid epoxy resin.

It has also been proposed to improve the heat stability of PVDCs by incorporating glycidyl methacrylate into the PVDC structure ("internal" stabilisation). In German Patent Application DE-A-25 23 769 in the name of Kanto Denka Kogyo there is a description of the manufacture of PVDC with improved heat stability by combined use of 0.5 to 10% by weight of glycidyl methacrylate in the aqueous suspension copolymerisation of vinylidene chloride and of other polymerisable vinyl monomers. In the best of cases, assuming the use of 10% by weight of glycidyl methacrylate at the beginning of the copolymerisation and the complete absence of hydrolysis of the epoxy groups during the copolymerisation, such copolymers would contain approximately 1% by weight of oxirane oxygen, which corresponds to an epoxy value of approximately 0.06. In this case, too, the improvement in heat stability takes place at the expense of the imperviousness of the PVDCs.

The objective of the present invention is to provide compositions based on vinylidene chloride copolymers stabilised against heat by the use of novel epoxide heat stabilisers which are particularly effective and which do not exhibit any of the abovementioned disadvantages.

SUMMARY OF THE INVENTION

To this end, the invention relates to compositions based on vinylidene chloride copolymers stabilised against heat by the use of an epoxide stabiliser, which are characterised in that the epoxide stabiliser is a glycidyl methacrylate polymer whose epoxy value is at least 0.3.

DESCRIPTION OF THE PREFERRED EMBODIMENTS

The epoxy value, commonly employed for characterising epoxy compounds, denotes the number of epoxide groups present in 100 g of polymer. The determination of the epoxy value is generally carried out by the addition of a hydrogen halide, in most cases hydrogen chloride, to the epoxide groups of the epoxy compound dissolved in a suitable solvent such as dimethylformamide. Various methods for evaluating the epoxy value are described in detail in the work by H. Lee and K. Neville entitled "Handbook of Epoxy Resins", McGraw-Hill Book Company, 1967, 4-14 to 4-21, incorporated by way of reference.

A glycidyl methacrylate polymer, referred to by the acronym poly(GMA) hereinafter is intended to denote both the GMA homopolymers and copolymers whose epoxy value is equal to at least 0.3, and mixtures thereof. Although GMA homopolymers exhibit the highest effectiveness where heat stability is concerned, preference is given to GMA copolymers, given that they generally offer a better compromise from the viewpoints of heat stability, transparency and imperviousness. The copolymers which are given preference are those whose epoxy value is equal to at least 0.4, more particularly to at least 0.45 and still more particularly to at least 0.5. By way of examples of GMA comonomers which can be employed there may be mentioned especially vinyl(idene) halides, alkyl (meth)acrylates, (meth)acrylonitriles and styrene.

Among the vinyl(idene) halides preference is given to vinyl(idene) chlorides and fluorides and still more particularly to chlorides, such as vinyl and vinylidene chlorides and mixtures thereof. A particularly preferred vinyl(idene) balide is vinylidene chloride.

Among alkyl (meth)acrylates preference is given to those in which the alkyl groups contain not more than 10 carbon atoms and, preferably, not more than 5 carbon atoms. By way of examples of such preferred (meth)acrylic esters there may be mentioned methyl acrylate and methyl methacrylate, ethyl acrylate and n-butyl acrylate.

The poly(GMA) content of the compositions according to the invention is not really critical, it being understood that the stabilising effect will be proportional to the poly(GMA) contents. A content of 0.5 parts per 100 parts by weight of PVDC (phr) already provides a significant improvement in heat stability. Nevertheless, at least 1 phr of PGMA is preferably incorporated in the PVDC and, furthermore, not more than 10 phr. Particularly preferred contents are between approximately 1.5 and 4.5 phr.

The polyGMAs form polymers which are known per se. They can be manufactured by any known technique of radical polymerisation, such as polymerisation in emulsion or in aqueous suspension under conditions which avoid the opening (hydrolysis) of the epoxide bridges, or else in organic solution in an aprotic solvent, preference being given to this latter technique which ensures that polymers with a high epoxy value are obtained in all cases. By way of examples of solvents which can be employed there may be mentioned ketones, such as methyl ethyl ketone, and by way of examples of catalysts, benzoyl peroxide and azobisisobutyronitrile.

PolyGMAs form effective heat stabilisers for all vinylidene chloride copolymers as defined above and obtained by any technique for the copolymerisation of vinylidene chloride such as, for example, aqueous emulsion or suspension. They are very particularly suitable for the heat stabilisation of vinylidene chloride copolymers with acrylic comonomers such as (meth)acrylic esters and/or nitriles and, still more particularly, acrylic esters.

The compositions according to the invention are suitable for the manufacture by extrusion (including coextrusion) of very diverse shaped articles exhibiting an excellent imperviousness/transparency compromise. They are more particularly suited for extrusion (including coextrusion) of films and sheets intended for packaging, still more particularly for food packaging. The use of compositions according to the invention for the extrusion (including coextrusion) of films and of sheets intended for packaging forms another aspect of the invention.

The examples which follow illustrate compositions according to the invention and their use for extrusion (in this case coextrusion) of films.

Examples 1 to 8 relate to the heat-stabilisation of a PVDC consisting of a copolymer of vinylidene chloride and of vinyl chloride, obtained by the use in aqueous emulsion copolymerisation of 70 parts by weight of vinylidene chloride with 30 parts by weight of vinyl chloride.

Examples 9 to 12 relate to the heat-stabilisation of a PVDC consisting of a copolymer of vinylidene chloride and of methyl acrylate, obtained by the use in aqueous suspension copolymerisation of 94 parts by weight of vinylidene chloride with 6 parts by weight of methyl acrylate.

In Examples 1 to 3 and 6 to 11, according to the invention, 2 phr of poly(GMA) have been used, more precisely:

Examples 1 and 9: GMA homopolymer (PGMA) with an epoxy value equal to 0.650

Examples 2 and 10: copolymer obtained by copolymerisation of 65 parts of GMA with 35 parts by weight of vinyl chloride (GMA-VC$_1$) which has an epoxy value equal to 0.525

Example 3: copolymer obtained by copolymerisation of 80 parts of GMA with 10 parts of VC$_2$ and 10 parts by weight of VC$_1$ (GMA-VC$_1$-VC$_2$) which has an epoxy value equal to 0.572

Example 6: copolymer obtained by copolymerisation of 70 parts of GMA with 30 parts by weight of methyl methacrylate (GMA-MMA) which has an epoxy value equal to 0.481

Example 7: copolymer obtained by copolymerisation of 70 parts of GMA with 30 parts by weight of ethyl acrylate (GMA-EA) which has an epoxy value equal to 0.488

Example 8: copolymer obtained by copolymerisation of 70 parts of GMA with 30 parts by weight of n-butyl acrylate (GMA-nBA) which has an epoxy value equal to 0.488

Example 11: copolymer obtained by copolymerisation of 70 parts of GMA with 30 parts by weight of vinylidene chloride (GMA-VC$_2$) which has an epoxy value equal to 0.500.

The nature and the quantities of poly(GMA) used in the Examples are briefly summarised in Table I which is appended.

In Examples 4, 5 and 12, given by way of comparison, epoxidised soya oil (ESO) was employed in quantities specified in the said Table I.

The compositions according to the invention (Examples 1 to 3 and 6 to 11) were prepared by mixing 1500 g of PVDC with 30 g of poly(GMA) in a fast mixer until a temperature of 70° C. was obtained, followed by cooling to room temperature.

The compositions according to comparative Examples 4, 5 and 12 were prepared by mixing 1500 g of PVDC with the appropriate quantities of preheated epoxidised soya oil introduced during the mixing at a temperature of 50° C., followed by cooling to room temperature.

The long-term heat stability (LTHS) of the compositions was evaluated by blending premixes in a mill maintained at 160° C. in the case of Examples 1 to 8 and at 180° C. in the case of Examples 9 to 12. The results of the evaluation of heat stability (LTHS), expressed as the time elapsed before the premixes become dark-coloured, are given in Table I appended.

The oxygen permeability of the compositions according to Examples 1 to 12 was measured on a three-layer coextruded composite comprising a middle PVDC layer and two outer layers of a copolymer of ethylene and vinyl acetate containing 91% by weight of ethylene (EVA), each being 30 μm in thickness. These structures were produced on a coextrusion plant comprising two single-screw extruders, a feed block and a flat die under the following thermal conditions:

temperatures of the first and last zones of extruder (single-screw): 10° C. below and 10° C. above, respectively, the melting temperature of the PVDC (melting temperature of the PVDC used in Examples 1 to 8: approximately 140° C., and of that used in examples 9 to 12: 160°–165° C.)

EVA extrusion temperature: 170° C.

feed block and die temperature: 170° C.

the coextruded film is cooled on a roller maintained at 22° C. (absence of orientation). The oxygen permeability (PO$_2$) of the coextruded composites (at 25° C. at a relative humidity (RH) of 85%) was evaluated on an apparatus of registered trademark Oxtran ® 1000-

H System from Mocon (USA). The results of this evaluation appear in Table I, appended. They are reported in cm: of oxygen per m² of film, bar and μm of PVDC thickness.

The transparency of the compositions according to Examples 9 to 12 is evaluated on strips with a thickness of 0.5 to 1.5 mm, extruded through a 40×1 mm die at a temperature of 165° C. The transparency is evaluated by photoelectrical measurement of the transmission of light through the strips, the results obtained, which are given in Table I, being expressed in μA, corrected to one mm of thickness.

The data relating to the composition and the results of evaluation of the compositions according to Examples 1 to 12 are given in Table I, appended.

TABLE I

| Example No. | Heat stabilizer Nature | Epoxy value | Quantity, phr | LTHS, min | $PO_2$, 25° C., 85% RH $cm^3$ $\mu m/m^2$ 24 h bar | Transparency, μA mm |
|---|---|---|---|---|---|---|
| 1 | PGMA | 0.650 | 2 | 45 | 110 | n.d.* |
| 2 | GMA-VC$_1$ | 0.525 | 2 | 35 | 110 | — |
| 3 | GMA-VC$_1$-VC$_2$ | 0.572 | 2 | 35 | 103 | — |
| 4 | ESO | 0.388 | 2 | 25 | 190 | — |
| 5 | ESO | 0.388 | 3 | 35 | 310 | — |
| 6 | GMA-MMA | 0.481 | 2 | 35 | 113 | — |
| 7 | GMA-EA | 0.488 | 2 | 30 | 107 | — |
| 8 | GMA-nBA | 0.488 | 2 | 35 | 110 | — |
| 9 | PGMA | 0.650 | 2 | 30 | 46 | 26 |
| 10 | GMA-VC$_1$ | 0.525 | 2 | 20 | 43 | 64 |
| 11 | GMA-VC$_2$ | 0.500 | 2 | 20 | 40 | 61 |
| 12 | ESO | 0.388 | 3 | 20 | 165 | 74 | n.d.* = not determined

What is claimed is:

1. A composition based on vinylidene chloride copolymers stabilised against heat by the use of an epoxide stabiliser, comprising:
    at least one vinylidene chloride copolymer containing from about 70 to about 96% by weight of monomer units derived from vinylidene chloride;
    an epoxide stabiliser which is at least one glycidyl methacrylate copolymer whose epoxy value is at least 0.4.

2. The composition according to claim 1, wherein the epoxy value of the at least one glycidyl methacrylate copolymer is at least 0.45.

3. The composition according to claim 1, wherein the at least one glycidyl methacrylate copolymer includes at least one comonomer selected from the group consisting of vinyl halides and vinylidene halides.

4. The composition according to claim 3, wherein the at least one comonomer selected from the group consisting of vinyl halides and vinylidene halides are chlorides.

5. The composition according to claim 1, wherein the at least one glycidyl methacrylate copolymer includes at least one comonomer selected from the group consisting of alkyl (meth)acrylates, (meth)acrylonitriles and styrene.

6. The composition according to claim 1, containing at least 0.5 parts and not more than 10 parts of the at least one glycidyl methacrylate copolymer per 100 parts by weight of the at least one vinylidene chloride copolymer.

7. The composition according to claim 6, containing from 1.5 to 4.5 parts of the at least one glycidyl methacrylate copolymer per 100 parts by weight of the at least one vinylidene chloride copolymer.

8. A film or sheet for use in packaging, comprising a composition based on a vinylidene chloride copolymers stabilized against heat by an epoxy stabilizer, the composition being comprised of at least one vinylidene chloride copolymer containing from about 70 to about 96% by weight of monomer units derived from vinylidene chloride; an epoxide stabilizer which is at least one glycidyl methacrylate copolymer whose epoxy value is at least 0.4.

9. The film or sheet according to claim 8, wherein the epoxy value of the at least one glycidyl methacrylate copolymer is at least 0.45.

10. The film or sheet according to claim 8, wherein the at least one glycidyl methacrylate copolymer includes at least one comonomer selected from the group consisting of vinyl halides and vinylidene halides.

11. The film or sheet according to claim 10, wherein the at least one comonomer selected from the group consisting of vinyl halides and vinylidene halides are chlorides.

12. The film or sheet according to claim 8, wherein the at least one glycidyl methacrylate copolymer includes at least one comonomer selected from the group consisting of alkyl (meth)acrylates, (meth)acrylonitriles and styrene.

13. The film or sheet according to claim 8, wherein the composition contains at least 0.5 parts and not more than 10 parts of the at least one glycidyl methacrylate copolymer per 100 parts by weight of the at least one vinylidene chloride copolymer.

14. The film or sheet according to claim 13, wherein the composition contains from 1.5 to 4.5 parts of the at least one glycidyl methacrylate copolymer per 100 parts by weight of the at least one vinylidene chloride copolymer.

* * * * *